United States Patent [19]

Nouis

[11] Patent Number: 5,245,824
[45] Date of Patent: Sep. 21, 1993

[54] METHOD AND APPARATUS FOR OPTIMIZING THE EXHAUST SYSTEM OF A TWO CYCLE ENGINE

[76] Inventor: Randy G. Nouis, 11524 Kings Coach Rd., Grand Blanc, Mich. 48439

[21] Appl. No.: 845,200

[22] Filed: Mar. 3, 1992

[51] Int. Cl.$^5$ ............................................. F02B 27/04
[52] U.S. Cl. ........................................ 60/274; 60/314
[58] Field of Search ................................. 60/314, 274

[56] References Cited

U.S. PATENT DOCUMENTS

| | | | |
|---|---|---|---|
| 3,064,417 | 11/1962 | Tryhorn | 60/314 |
| 4,558,566 | 12/1985 | Shirakura | 60/314 |
| 4,941,319 | 7/1990 | Yamamoto | 60/314 |

Primary Examiner—Douglas Hart
Attorney, Agent, or Firm—James C. McLaughlin

[57] ABSTRACT

The invention communicates a resonant volume with a conventional resonant exhaust system of a two-cycle engine such that the one decibel band-width of the resonant volume includes the peak RPM of the unmodified two-cycle engine.

The preferred embodiment of the apparatus comprises a quarter wave tube of optimal dimensions that is closed at one end and attached to a conventional resonant exhaust system within an optimal zone.

The process or method comprises the steps necessary to design the optimal length and cross-section area (or band-width) of the quarter wave tube and its placement on a conventional resonant exhaust system. From a suitably detailed graph or tabulation of power versus RPM for an unmodified engine, two critical RPM values are determined. The effective speed of sound within the exhaust system is estimated. Using the two critical RPM values and the speed of sound within the exhaust system, the optimum critical frequency of the tube (thus the length of the tube) and the optimum cross-section area of the tube are determined. The tube so designed has its open end attached to a conventional resonant exhaust system at a point closer to the cylinder than the middle of the section of constant cross-section.

While the preferred embodiment of the present invention involves a conventional resonant exhaust system attached to a single cylinder, the method is believed to be useful with exhaust systems attached to a plurality of cylinders.

14 Claims, 7 Drawing Sheets

METHOD AND APPARATUS FOR OPTIMIZING THE EXHAUST SYSTEM OF A TWO CYCLE ENGINE

TECHNICAL FIELD OF THE INVENTION

The technical field of the present invention is that of resonant exhaust systems used with two-cycle engines. More particularly, the present invention is concerned with the method of optimizing such exhaust systems with multiple resonances such that the associated engine is able to deliver enhanced power over a broad and desired range of engine speed (RPM), and is concerned with the resultant exhaust systems. Most particularly, the present invention relates to effective, tuned exhaust systems that are attached to the exhaust port of one or more cylinders of a two-cycle engine and that have no moving parts.

BACKGROUND INFORMATION

Shortly after the ignition of an air-fuel mixture in the cylinder of a two-cycle engine, the moving piston uncovers an exhaust port and a fresh charge of fuel and air is induced into the cylinder. A primary goal of the exhaust system is to remove a maximum of the burned and oxygen-depleted gasses from the cylinder while minimizing the amount of the induced fuel-rich air also removed.

Practical two-cycle engines use resonant exhaust systems adjusted so that a minimum of resistance is offered to the exit of exhaust gasses at one moment while offering resistance to the outward flow of induced fuel-rich gases a moment latter. A conventional resonant exhaust system for a two-cycle engine is a conduit attached to the side of the cylinder. Said conduit flares outwardly from the cylinder's exhaust port to a section of constant cross-section that terminates in a constricting section and a tail-pipe. The outwardly flared section, sometimes called the megaphone, facilites the easy exit of the burned gasses from the cylinder. The constricting section reflects a mechanical wave optimally timed to arrive back at the cylinder in time to tend to impede the exit of fuel-rich air from the cylinder and to increase slightly the pressure of the fuel-rich air in the cylinder above atmospheric pressure. The combination of facilitating removal of the oxygen depleted gasses, retaining the fuel-rich air, and pressurizing of the fuel-rich air results in enhancing the power delivered by the engine.

The delay between the pulse of the exhaust gasses entering the megaphone and the arrival of the reflected wave at the cylinder, is dependent on the propagation velocity (taking into account the temperature and composition of the gasses) and the effective distance between the cylinder and the reflection zone. This distance (and the effective band-width of the active portion of the conduit) is such that the reflected wave is effective over only a certain RPM range. The effective range is usually centered slightly below the RPM that produces a maximum or peak power (the peak RPM) with the result that power out of the engine is only enhanced over a relatively narrow RPM range in the vicinity of peak RPM. If the effective range is centered significantly below the RPM that produces peak power then performance is enhanced in that range of RPM, but performance is adversely affected where hitherto peak power had been attained. In other words, the reasonable design of a conventional resonant exhaust system uses a resonance to improve performance only over a span of RPM near the RPM that produces peak power. A desire to enhance performance at lower RPM (midrange), without compromising performance near peak RPM, has long been felt.

Various attachments or modifications have been made to the above described conventional resonant exhaust system with the goal of improving midrange performance. It has been known for go-cart enthusiasts to form the constricted section and tail pipe, of a conventional resonant exhaust system, in a sliding form (similar to a trombone slide) and to adjust the effective length while the vehicle is moving, and the engine is running, so as to maintain optimum performance for the instant RPM! It is known to use mechanical valves to modify the exhaust system depending on the instant state of the engine. U.S. Pat. No. 4,558,566 discloses the use of a valve "at the inlet of the resonance chamber for opening or closing the inlet in a predetermined operation region of the engine". U.S. Pat. No. 4,554,785 discloses an exhaust apparatus "having a connecting line which connects a sub-chamber to an engine exhaust line and which is provided with an opening and closing value connected to a power source responsive to the number of engine revolutions per minute." Additional U.S. patents that disclose the use of valves in the exhaust system include: U.S. Pat. Nos. 4,545,200, 3,703,937, and 4,570,439. The use of moving parts in or near exhaust gasses inherently presents reliability problems. A need exists in the art for a method of designing modifications to a conventional resonant exhaust system that involve no parts that are moved while the engine is in operation and a method that can be applied to two-cycle engines generally.

Accordingly, an object of the present invention is to provide a device for enhancing midrange performance of an engine using a conventional resonant exhaust system without significant diminution of performance in the vicinity of peak RPM and to teach a method for making such a device.

More particular objects of the present invention are for the device of the present invention not to use any moving parts and to be able to be designed to be effective for essentially any two-cycle engine using a conventional resonant exhaust system.

Further objects of the present invention include applying the method to a plurality of cylinders and teaching alternative forms for the device.

SUMMARY OF THE INVENTION

The foregoing and other objects and advantages are achieved with the apparatus and process disclosed below. The central part of the present invention is that communicating a resonant volume with a conventional resonant exhaust system such that the 1 db band-width of the resonant volume spans a region of engine RPM that includes the peak RPM will significantly enhance the power delivered by a two-cycle engine.

Figure 4:
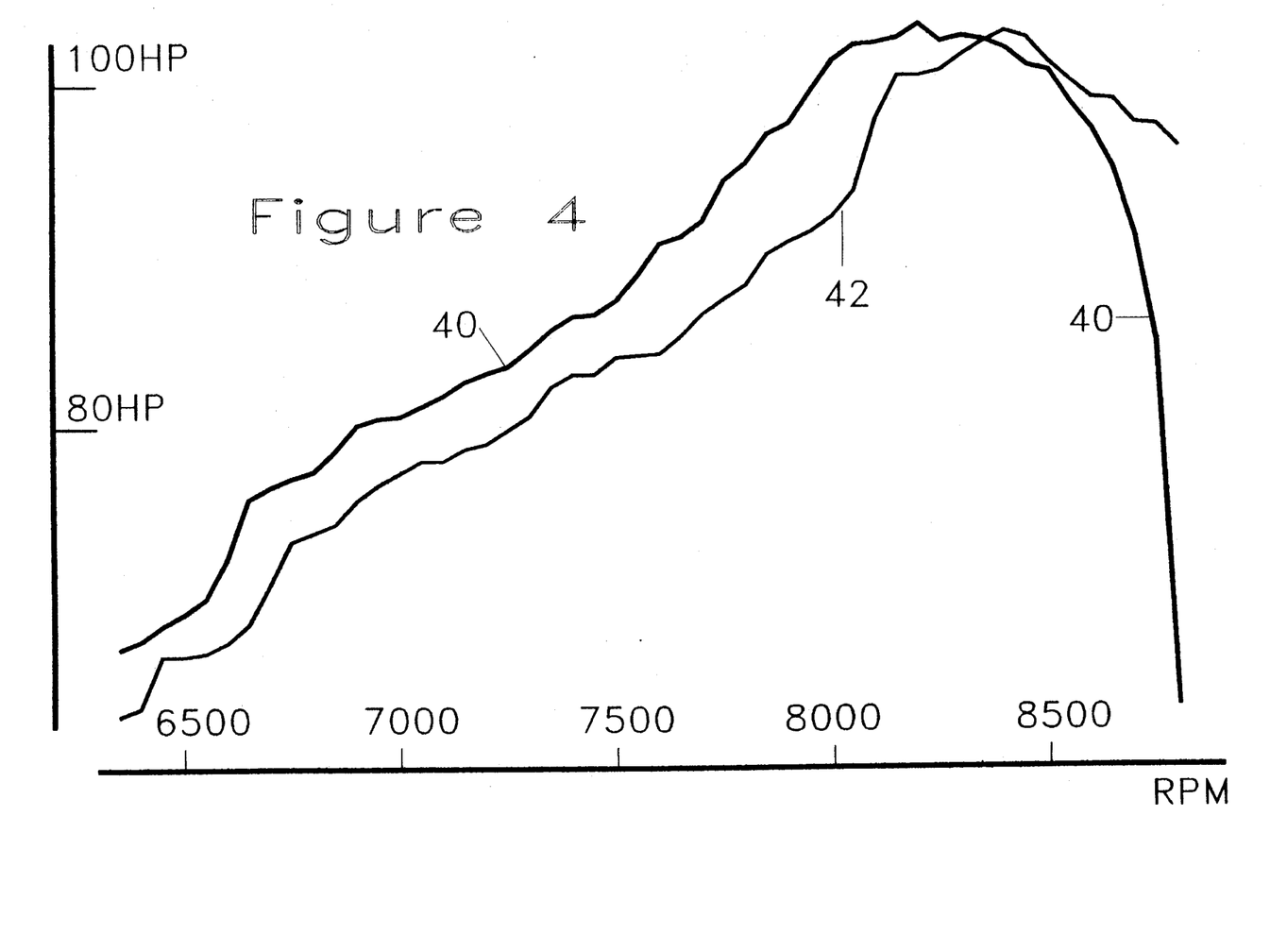
FIG. 4 is a plot of output power versus RPM of a Fugi 500 cc, twin cylinder, two-cycle engine with and without the present invention.

The preferred embodiment of the apparatus comprises a quarter wave tube of optimal dimensions that is closed at one end and attached to a conventional resonant exhaust system within an optimal zone. FIG. 4 illustrates the measured improvements attained with a specific engine where curve 42 shows the performance without the present invention and curve 40 shows the performance with the present invention.

The process or method comprises the steps necessary to design the optimal length and cross-section area (or band-width) of the quarter wave tube and its placement on a conventional resonant exhaust system. The process steps are dependent on the characteristics of the two-cycle engine with a conventional resonant exhaust system attached to each cylinder. Therefore, the design starts with a determination or measurement of the dependence of power delivered on RPM. From a suitably detailed graph or tabulation of power versus RPM, two critical RPM values are determined. From the expected temperature and composition of the gasses within the exhaust system, the speed of sound within the exhaust system is estimated. Using the two critical RPM values and the speed of sound within the exhaust system, the optimum critical frequency of the tube (thus the length of the tube) and the optimum cross-section area of the tube are determined. In the alternative, one may use a desired cross-section area of the tube, the effective speed of sound, and one critical RPM to determine the optimum critical frequency. The tube so designed has its open end attached to a conventional resonant exhaust system at a point closer to the cylinder or engine than the middle of the section of constant cross-section.

While the preferred embodiment of the present invention involves a tube, alternative shapes, forms, and attachments exist that are expected to provide the same benefits as a tube. While the preferred embodiment of the present invention involves a conventional resonant exhaust system attached to a single cylinder, the method is believed to be useful with exhaust systems attached to a plurality of cylinders.

DETAILED DESCRIPTION OF THE INVENTION AND ITS PREFERRED EMBODIMENT

Figure 1:
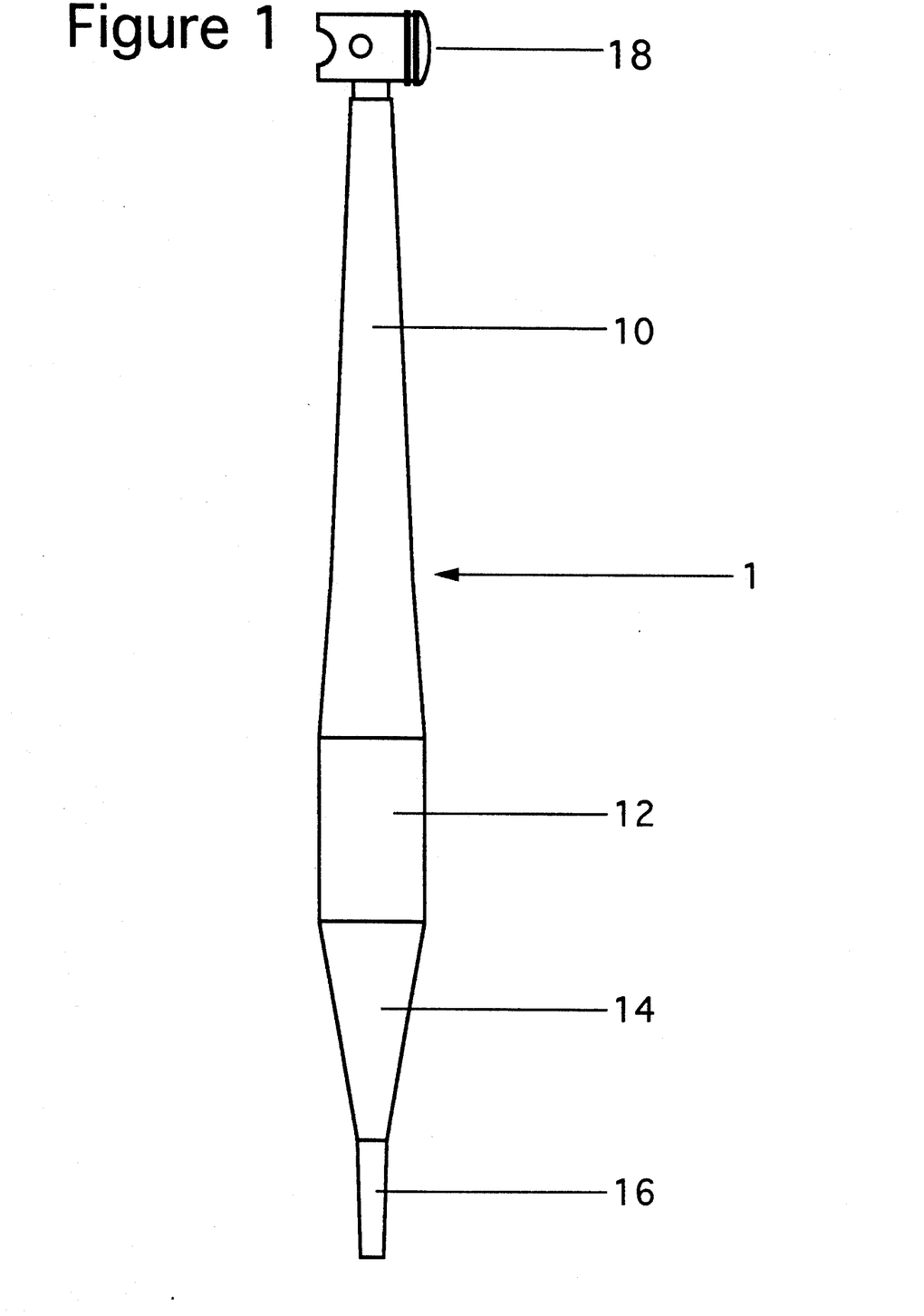
FIG. 1 is a side view of a conventional resonant exhaust system attached to the exhaust port of a cylinder.

The classic work, *The Basic Design Of Two-Stroke Engines* by Professor Gordon P. Blair (Society of Automotive Engineers, 1990), includes the design of conventional resonant exhaust systems. Such a system is shown on FIG. 1. Conventional resonant exhaust system 1 includes megaphone 10, constant diameter section 12, constricted section 14, and tail pipe 16. Megaphone 10 is connected to the exhaust port associated with piston 18 and tail pipe 16 is vented to the atmosphere. It may be that megaphone 10 is optimally in the form of an exponentially flaring horn, however it is customarily constructed of a plurality of regular cones. It is assumed that the conventional resonant exhaust system 1 used as part of the present invention has been competently designed and constructed.

The apparatus of the present invention includes conventional resonant exhaust system 1 and tube 2 (shown on FIG. 2) with dimensions and attachment dictated by the method of the present invention. Tube 2 has a closed end 22 and an open end 24. In the preferred embodiment of the present invention, tube 2 is cylindrical. For convenience in handling tube 2, the preferred embodiment of tube 2 includes one right-angle bend. It will be apparent to one skilled in the art that alternative means for producing a closed end, quarter wave resonant tube with a known resonant frequency and band-width exist.

Figure 3:
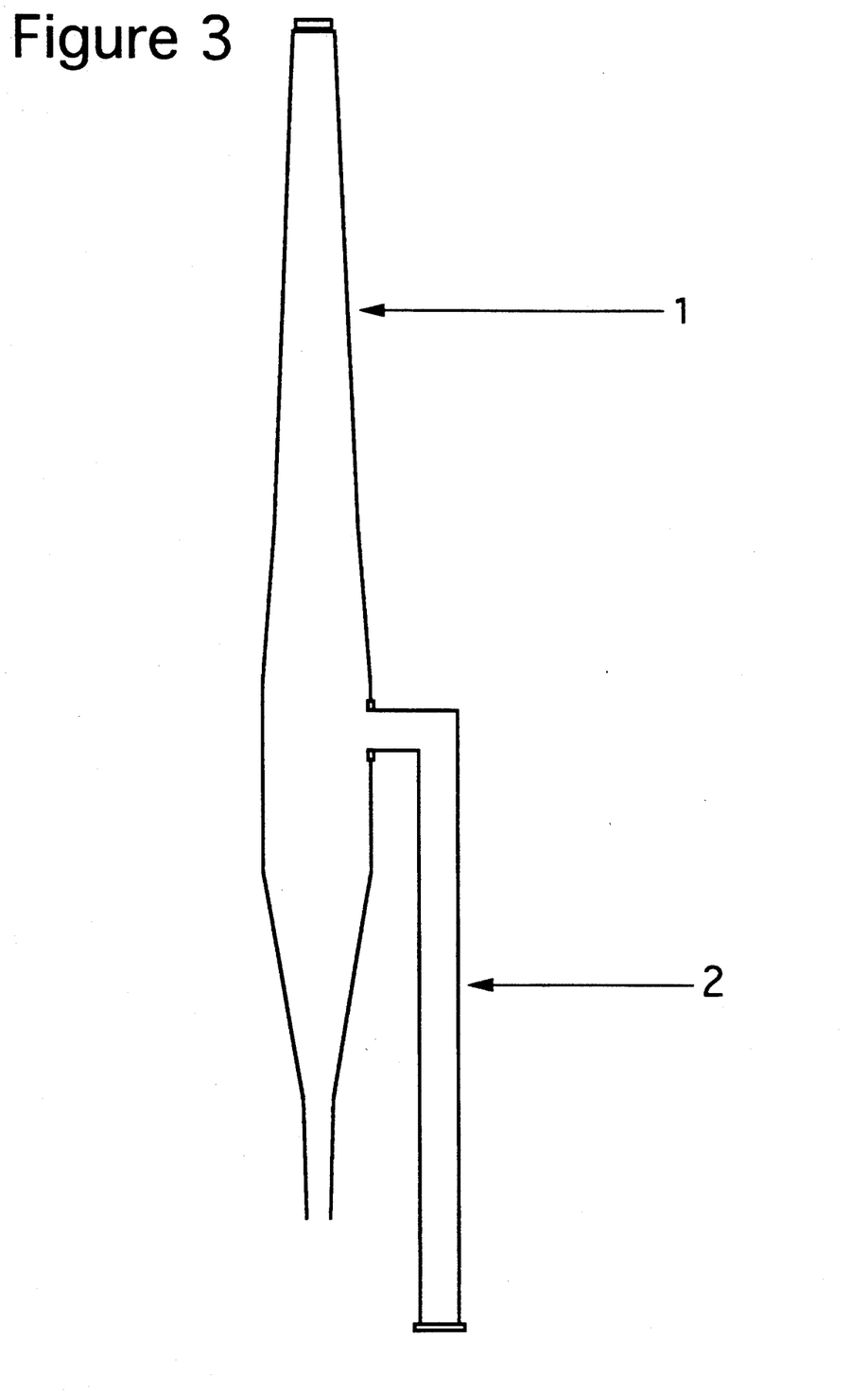
FIG. 3 is a cross section of a conventional resonant exhaust system exhaust system with a quarter wave resonant tube of the preferred embodiment of the present invention attached thereto.

The preferred embodiment of the apparatus of the present invention includes the attachment of open end 24 of tube 2 to conventional resonant exhaust system 1 at a point that is within the half of constant diameter section 12 closest to piston 18. FIG. 3 shows such an attachment, using a flange on open end 24, so that tube 2 communicates with conventional resonant exhaust system 1. The present invention encompasses attachment of tube 2 at a point between piston 18 and the middle of constant diameter section 12. Two enclosed or partially enclosed volumes are said to communicate with each other when gas in one volume is able to pass into the other volume.

When an enclosed volume communicates with a conduit, the enclosed volume effects a notch filter (bandstop) to sound at, and near, the resonant frequency of the enclosed volume. The attenuation at frequencies distant from the resonant frequency is said to be zero decibels (0 db). As frequency approaches the resonant frequency, from both above and below the resonant frequency, attenuation will be 1 db at two frequencies. The span between those two 1 db frequencies is said to be the 1 db band-width. In other words, the sound attenuation of 1 db used herein is with respect to the attenuation distant from the resonant frequency. Frequency may be measured in Hertz or in RPM.

The method of the present invention includes communicating an enclosed resonant volume with a conventional resonant exhaust system such that the one decibel (1 db) band-width of the resonant volume spans a region of engine RPM that includes the peak RPM or such that the upper 1 db point of the resonant volume is near the peak RPM. The preferred embodiment uses a tube 2 as the resonant volume. The preferred method places the upper 1 db point of the resonant volume near the peak RPM.

The method starts with the measurement of the power delivered by the engine versus the RPM of the engine (without the attachment of the device of the present invention). Measurements should extend somewhat beyond the RPM where the power peaks. Extending to about 1.1 times the RPM where the power is a maximum is sufficient. Determine the RPM that produces a maximum of delivered power. This value of RPM is called the peak RPM and is denoted as Rp. Curve 42 on FIG. 4 is an example of such a measurement.

Select an RPM smaller than Rp that is the center of the region where it is desired to improve performance and call it Ro. Generally Ro is greater than about 0.85 times Rp or the dimensions of the resultant tube become unwieldy.

Estimate the expected speed of sound and call it c. The primary variable in a prediction of c is the temperature of the gasses in the active portion of the exhaust system (including the gas in the tube). The gas temperature varies a great deal. The gas temperature depends on the proximity to piston 18 due to parameters including the temperature of the gases coming from the exhaust port (dependent on the degree of leaning), ambient temperature outside of the system (also variable), rate of flow of outside air, and the effective thermal resistance of the walls of the exhaust system. Since significant changes in the apparent c may be effected by enriching or leaning the fuel-air mixture, changing the rate of air flow (by moving an associated vehicle faster or slower), or running the engine in the Arctic rather than the Sahara, it follows that provision should be made to vary somewhat the resonant volume to account for the expected changes in the apparent value of c. Some applications for engines are such that a value for apparent c will not vary significantly, and in such a case little or no provision for varying the resonant volume needs to be made. It has been found that for measured systems, operating with a nominal ambient temperature of roughly 25° C. and with minimal air circulation, the apparent c is approximately 1300 feet per second.

Measure the diameter of constant diameter section 12 and call it D. Calculate the desired nominal diameter of tube 2 by dividing D by the square root of the absolute value of the tangent of $((\pi/2)(R_p/R_o))$ and call it Dn. (Dn=D+the square root of the absolute value of tan $((\pi/2)(R_p/R_o))$) Note that Dn might not be that of commercially available tubes. An alternative step that starts with Dn and determines Ro is disclosed below.

Construct a cylindrical tube with an open end and a closed end, a diameter of about Dn, and an effective length of about fifteen times c divided by Ro. When significant, a correction of 0.4 times Dn may be subtracted from the effective length.

Communicate the open end of the tube with conventional resonant exhaust system 1 at a point between the cylinder and the middle of constant diameter section 12. Such communication is preferably assisted with a flange on the open end of the tube being attached over a mating hole in the conventional resonant exhaust system. The preferred communicating point is within the half of the constant diameter section that is closest to the cylinder.

In addition to the above steps, it is desirable to provide means for adjusting the length of the tube and (while measuring the power delivered by the engine at Rp) to adjust slightly the length of the tube so as to have roughly the same power as was measured without the tube being attached. This adjustment provides the means to negate the cumulative effects of unavoidable errors in estimating c and errors in determining other parameters. In the preferred embodiment of the present invention, the tube is provided with a telescoping section.

An alternative to the above step of selecting Ro is to select Dn (and thus the ratio Dn/D) and use it to calculate Ro. The preferred alignment of the upper 1 db point of a tube with Rp results in the square of Dn/D times the absolute value of tan $((\pi/2)(R_p/R_o))$ being approximately one. That is: $(Dn/D)^2 * | \tan((\pi/2)(R_p/R_o)) | \approx 1$. This relationship, central to the preferred embodiment of the present invention, may be solved for Ro when given Dn, D, and Rp. Care must be exercised when using this relationship as the use of arctangent will result in spurious values. Putative values for Ro should be tested for validity by substituting them into the expression. Because of the desire to use tubes with commercially available diameters, it is appropriate to evaluate the effect of several values of Dn and then select one for use.

In all of the steps, compatible units must be used. The argument for the tangent function is in radians.

FIG. 4 plots the output power of a Fugi 500 cc, twin cylinder, two-cycle engine versus RPM. The curves were produced by plotting lines between measured values. Plot 42 is for the engine without the present invention. Plot 40 is for the same engine with the addition of the preferred embodiment as shown on FIG. 3. Over the midrange the improvement is roughly 4 horsepower and from about 7600 RPM to 8100 RPM the improvement is roughly 6 or 7 HP.

It is possible to use such a large Dn that the effective pressure in the cylinder will rise to a level having the potential to cause damage. It is also possible to have a situation where, using the present invention, the engine is not capable of exceeding a critical value of RPM. Such large values of Dn are unlikely to be used because they also result in a relatively narrow region of RPM over which improvement is seen.

Figure 5A:
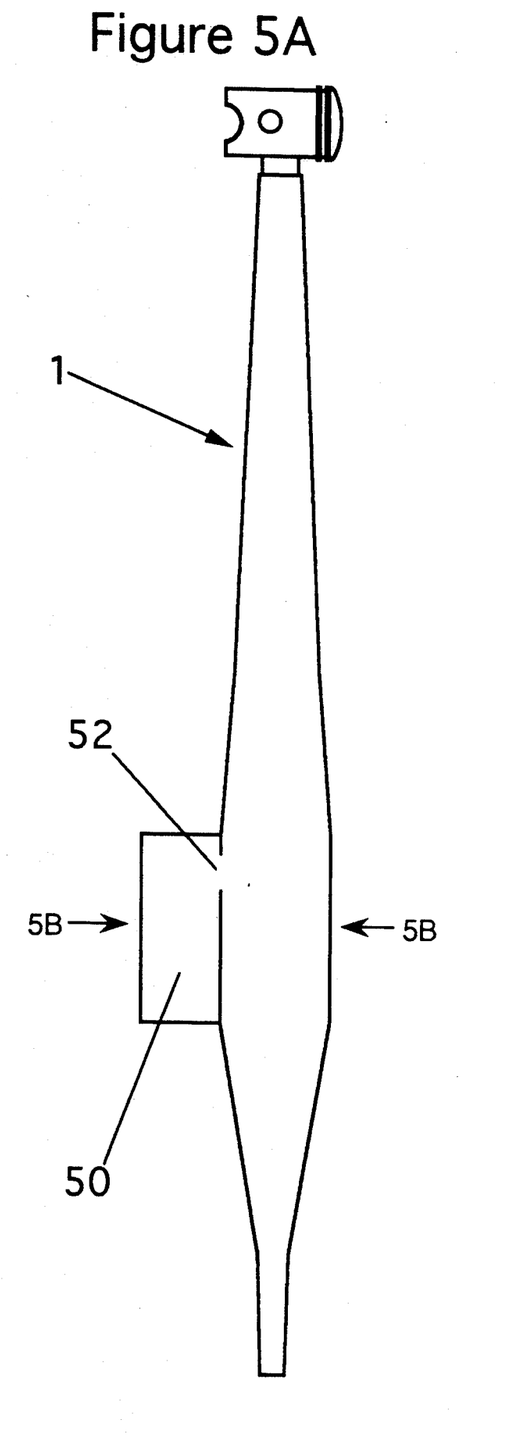
FIG. 5a is a longitudinal cross section of the first alternative embodiment.
Figure 5B:
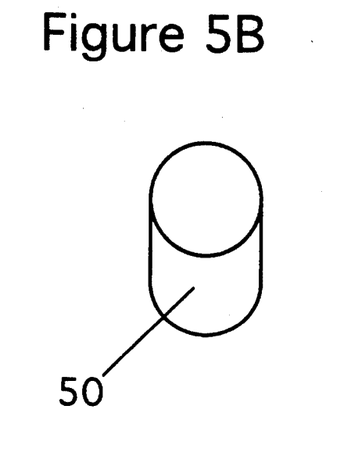
FIG. 5b is a tangential cross section of the first alternative embodiment.
Figure 6:
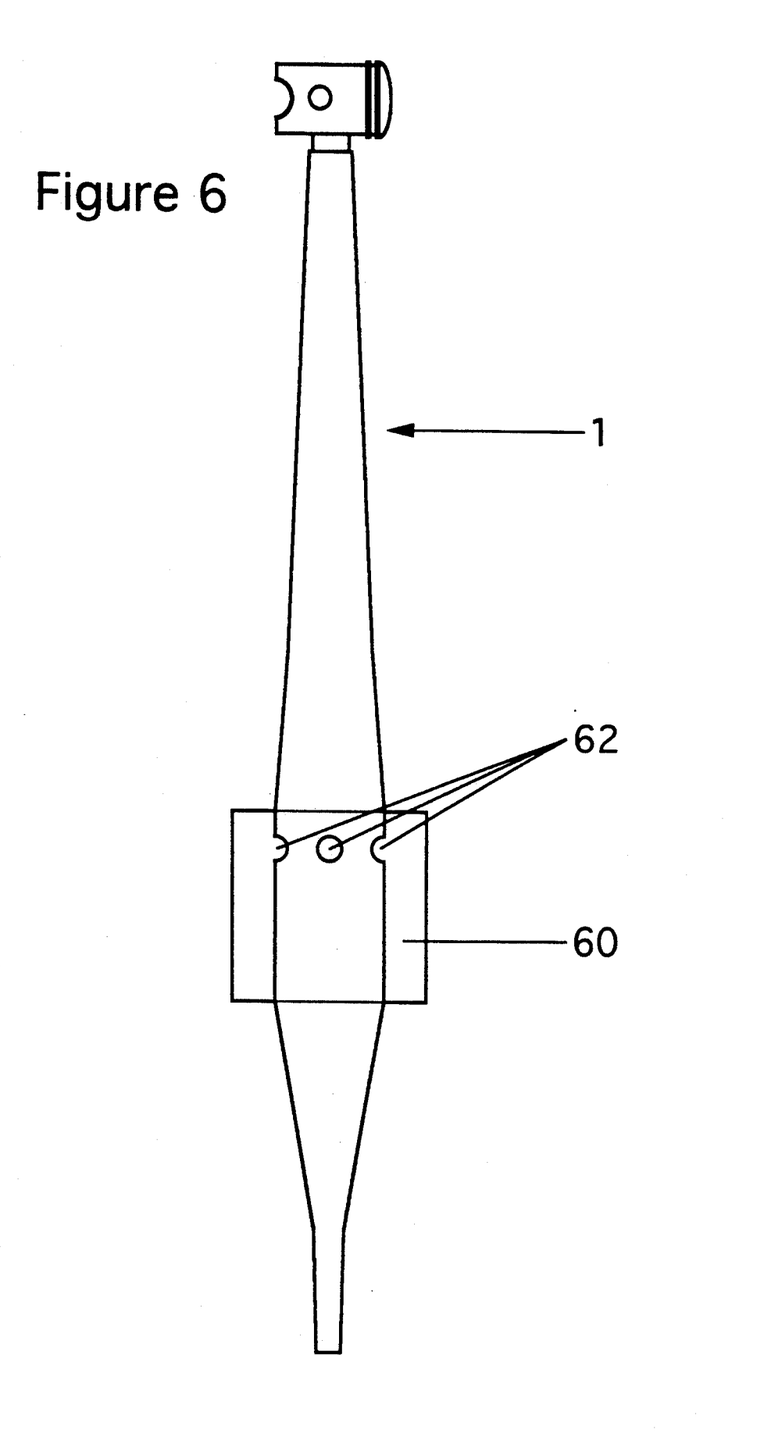
FIG. 6 is a longitudinal cross section of the second alternative embodiment.
Figure 7:
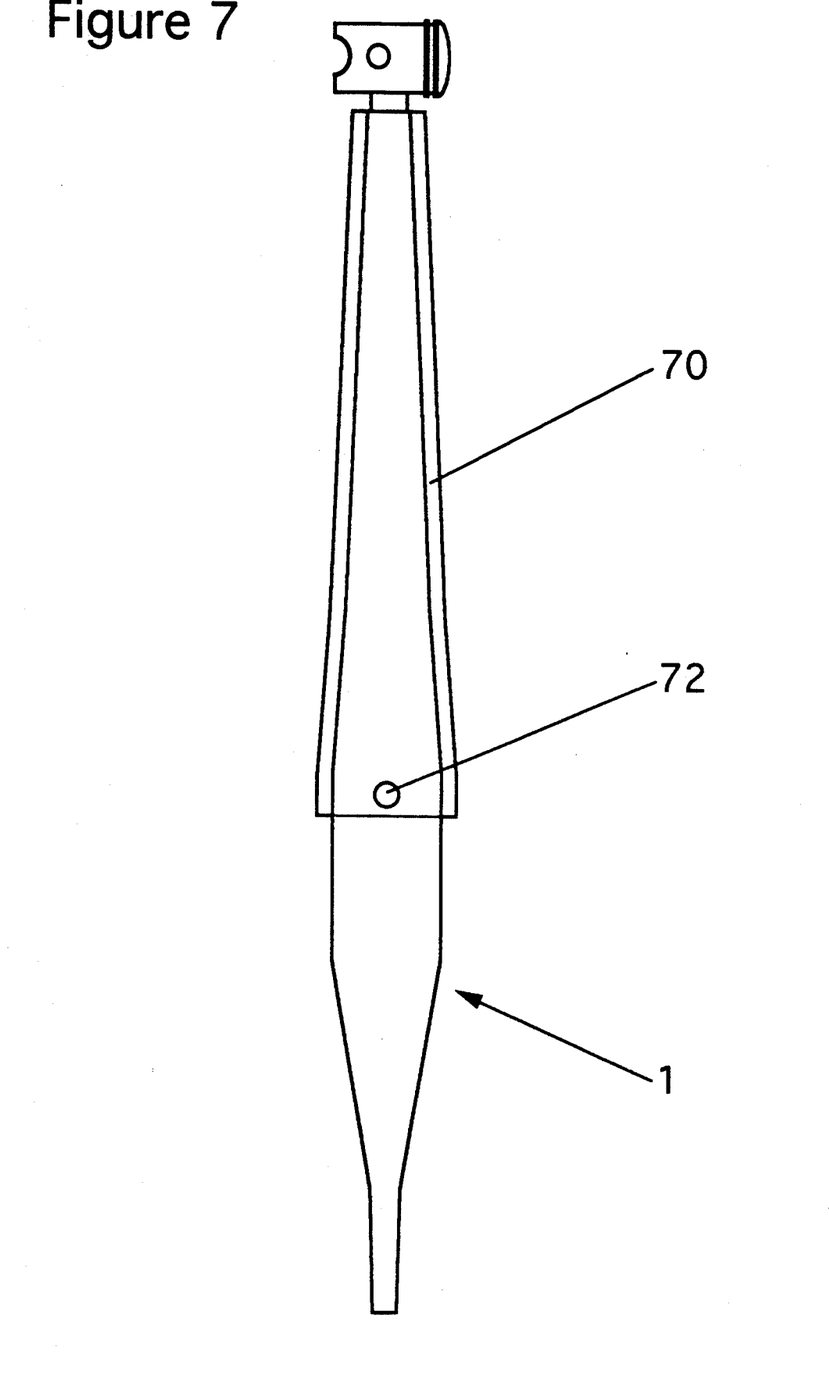
FIG. 7 is a longitudinal cross section of the third alternative embodiment.

FIGS. 5A, 5B, 6, and 7 show alternative embodiments. These alternative embodiments illustrate some equivalents for the tube 2 of the preferred embodiment and illustrate how the alternative embodiments communicate with their associated conventional resonant exhaust system 1. Because these alternative embodiments are in closer proximity to conventional resonant exhaust system 1 than is tube 2 in the preferred embodiment, they are expected to experience smaller excursions in apparent c with changes in ambient temperature. FIGS. 5A and 5B show a resonant volume 50 slung below conventional resonant exhaust system 1 and communicating thereto through orifice 52. FIG. 6 shows a resonant volume 60 surrounding the constant diameter section of conventional resonant exhaust system 1 and communicating thereto through a plurality of orifices 62. FIG. 7 shows a resonant volume 70 surrounding the megaphone and the first part of the constant diameter section of conventional resonant exhaust system 1, and communicating thereto through orifice 72.

While the preferred embodiment of the present invention involves a conventional resonant exhaust system attached to a single cylinder, the method is believed to be useful with exhaust systems attached to a plurality of cylinders.

The preferred embodiment and alternative embodiments of the present invention have been described in detail. The embodiments described are illustrative and not restrictive.

Figure 2:
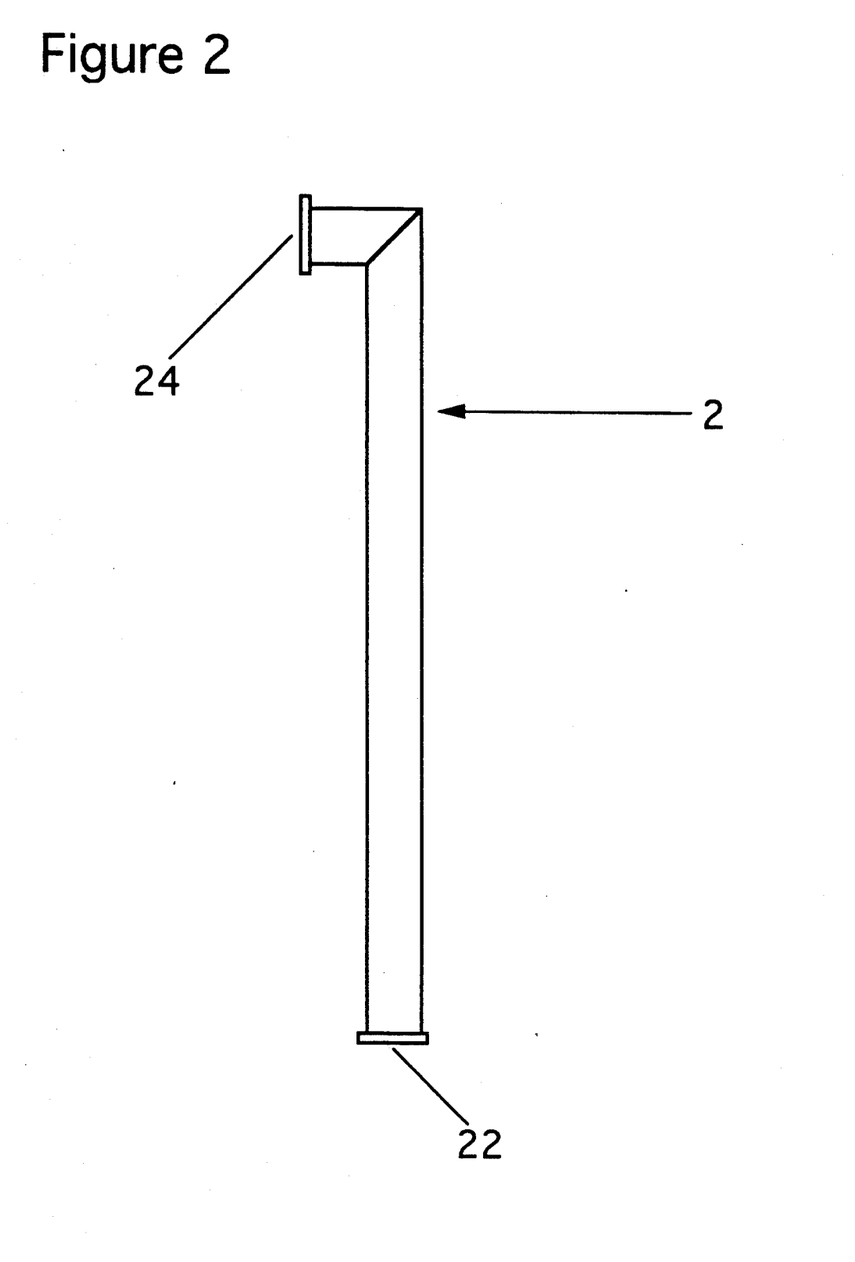
FIG. 2 is a side view of a quarter wave resonant tube of the preferred embodiment of the present invention.

Appendix Showing the Derivation of Relationships Existing when the Sound Attenuation Due to Tube 2 is One Decibel Given:

the nominal diameter of tube 2 ($D_n$), the diameter of constant diameter section 12 (D), the peak rmp ($R_p$), the rpm smaller than $R_p$ that is the center of the region where it is desired to improve performance ($R_o$), and the expected speed of sound (c); and that the upper 1 db attenuation point due to tube 2 occurs near $R_p$:

The transmission loss or attenuation (A) of sound at frequency f Hz passing through a conduit of diameter D, with a closed-end tube of length L and diameter $D_n$ communicating therewith, is known to be:

$$A = 10 \log_{10}(1 + (R^4 \tan^2 (kl))/4) \text{db}. \quad \text{eqn.1}$$

where:

$$R = D_n/D, \quad \text{eqn.2}$$

$$k = 2\pi f/c, \quad \text{eqn.3}$$

where f is the excitation frequency, and $$l = L + 0.4 D_n; \quad \text{eqn.4}$$

and where the quarter wave resonant frequency of the closed-end tube is:

$$f_r = c/(4l). \quad \text{eqn.5}$$

Substituting eqn.3 and eqn.5 into eqn.1 yields:

$$A = 10 \log_{10}(1 + R^4 \tan^2 ((\pi/2)(f/f_r))/4) \text{db}. \quad \text{eqn.6}$$

Clearly, because of the properties of $\tan^2$, two excitation frequencies near $f_r$ ($f_u > f_r$ and $f_L < f_r$) exist such that at those frequencies A is equal to 1 db. $f_u$ is called the upper 1 db point and $f_L$ is called the lower 1 db point. The 1 db band-width extends from $f_L$ to $f_u$.

One may effect the preferred method by placing the upper 1 db point near the peak rpm. Thus, in eqn.6, A is set equal to 1, and f and $f_r$ are recast as $R_p = 60$ f and $R_o = 60$ $f_r$ to yield:

$$R^4 \tan^2((\pi/2)(R_p/R_o)) = 1.0357 \ldots \quad \text{eqn.7}$$

Taking the fourth root of both sides of eqn.7, and substituting eqn.2 for R, yields the useful result that:

$$(D_n/D)(\sqrt{|\tan((\pi/2)(R_p/R_o))|}) = 1.0088 \ldots \approx 1. \quad \text{eqn.8}$$

Thus when the alignment of the preferred embodiment of the present invention is effected, $D_n$ is essentially equal to D divided by the square root of the absolute value of $\tan((\pi/2)(R_p/R_o))$, as is found and used in the body of the specification.

$$D_n \approx D/(\sqrt{|\tan((\pi/2)(R_p/R_o))|}) \quad \text{eqn.9}$$

Additionally (from eqn.4, eqn.5, and $R_o = 60$ $f_r$) the length of tube 2 is about fifteen times c divided by $R_o$ with a subtractive correction, when significant, of 0.4 times $D_n$.

I claim:

1. A method for improving the performance of a two-cycle engine having its exhaust ports attached to a conventional resonant exhaust system that has an enlarged section of essentially constant diameter, and that has a peak delivered power of P at Rp RPM, comprising the steps of:
    selecting an RPM smaller than Rp that is the center of the region where it is desired to improve performance, said smaller RPM to be denoted as Ro;
    constructing a volume resonant at Ro with an upper 1 db point near Rp; and
    communicating said volume with the conventional resonant exhaust system at a point between the engine and the middle of the section of the conventional resonant exhaust system having an essentially constant diameter.

2. A method as described in claim 1, further including the step of:
    adjusting slightly the resonant frequency of said volume while measuring the power delivered by the two-cycle engine at Rp (with said volume communicating with the conventional resonant exhaust system) so as to have a delivered power of about P.

3. A method as described in claim 1, wherein said communicating point is within the half of the section of essentially constant diameter closest to the engine.

4. A method for improving the performance of a two-cycle engine, where the exhaust port of each cylinder of the two-cycle engine is attached to a conventional resonant exhaust system and the conventional resonant exhaust system has an enlarged section of essentially constant diameter, comprising the steps of:
    measuring the power delivered by the two-cycle engine versus the RPM of the two-cycle engine to about 1.1 times the RPM that produces a maximum of delivered power;
    determining the RPM that produces a maximum of delivered power, said RPM to be denoted as Rp;
    selecting an RPM smaller than Rp that is the center of the region where it is desired to improve performance, said smaller RPM to be denoted as Ro;
    estimating the expected speed of sound, said speed of sound to be denoted as c;
    measuring the diameter of the section of essentially constant diameter, said diameter to be denoted as D;
    calculating a nominal diameter by dividing D by the square root of the absolute value of $\tan((\pi/2)(Rp/Ro))$, said nominal diameter to be denoted as Dn;
    constructing a cylindrical tube with an open end and a closed end, diameter of about Dn, and effective length of about 15*c/Ro; and
    communicating said open end of said tube with the conventional resonant exhaust system at a point between the engine and the middle of the section of essentially constant diameter.

5. A method as described in claim 4, wherein said Ro is greater than about 0.85*Rp.

6. A method as described in claim 4, further including the step of:
    adjusting slightly the length of said tube while measuring the power delivered by the two-cycle engine at Rp (with said tube communicating with the conventional resonant exhaust system) so as to have about the same power delivered at Rp as measured in said step of measuring the power.

7. A method as described in claim 4, wherein said communicating point is within the half of the section of essentially constant diameter closest to the engine.

8. A method as described in claim 4, wherein said c is about 1300 feet per second.

9. An apparatus for improving the performance of a two-cycle engine having its exhaust ports attached to a conventional resonant exhaust system that has an enlarged section of essentially constant diameter D, and that has a peak delivered power of P at Rp RPM, comprising:
    a cylindrical tube with:
        an open end and a closed end,
        an effective length such that said tube is resonant at an RPM smaller than Rp that is the center of the region where it is desired to improve performance, said smaller RPM to be denoted Ro, and a diameter such that said tube has an upper 1 db point that is near Rp, said diameter to be denoted Dn; and said open end is attached to the conventional resonant exhaust system at a point that is between the engine and the middle of the section of essentially constant diameter so that said tube communicates with the conventional resonant exhaust system.

10. An apparatus as described in claim 9, wherein said tube further includes means for slightly varying its effective length.

11. An apparatus as described in claim 9, wherein said tube further includes one bend.

12. An apparatus as described in claim 9, wherein said open end is attached within the half of the essentially constant diameter section that is closest to the engine.

13. An apparatus as described in claim 9, wherein D, Rp, Ro, and Dn are related by the approximate equation:

$$(Dn/D)^{2} * |\tan((\pi/2)(Rp/Ro))| \approx 1.$$

14. An apparatus as described in claim 9, wherein said effective length is approximately fifteen times the effective speed of sound divided by Ro.

* * * * *